US009636654B2

(12) United States Patent
Oshinowo et al.

(10) Patent No.: US 9,636,654 B2
(45) Date of Patent: May 2, 2017

(54) MODIFYING FLOW OF A REACTOR INLET DISTRIBUTOR

(71) Applicant: PHILLIPS 66 COMPANY, Houston, TX (US)

(72) Inventors: Olanrewaju M. Oshinowo, Katy, TX (US); Brad P. Palmer, Fulshear, TX (US)

(73) Assignee: Phillips 66 Company, Houston, TX (US)

( * ) Notice: Subject to any disclaimer, the term of this patent is extended or adjusted under 35 U.S.C. 154(b) by 105 days.

(21) Appl. No.: 13/779,935

(22) Filed: Feb. 28, 2013

(65) Prior Publication Data

US 2013/0221123 A1     Aug. 29, 2013

Related U.S. Application Data

(60) Provisional application No. 61/604,332, filed on Feb. 28, 2012.

(51) Int. Cl.
*B01J 19/00* (2006.01)
*B01J 8/02* (2006.01)

(52) U.S. Cl.
CPC ......... *B01J 19/0053* (2013.01); *B01J 8/0214* (2013.01); *B01J 8/0278* (2013.01);
(Continued)

(58) Field of Classification Search
CPC ... B01J 4/002; B01J 4/005; B01J 8/025; B01J 8/0278; B01J 8/0214; B01J 2204/002;
(Continued)

(56) References Cited

U.S. PATENT DOCUMENTS

| 4,165,970 A | * | 8/1979 | Rudolph | ............. C10J 3/06 110/229 |
| 5,098,690 A | * | 3/1992 | Koves | ............. B01J 8/0278 239/533.1 |

(Continued)

FOREIGN PATENT DOCUMENTS

WO     2009057909     5/2009

OTHER PUBLICATIONS

PCT Notification of Transmittal of the International Search Report and the Written Opinion of the International Searching Authority, or the Declaration, International Application No. PCT/US2013/028229, International Filing Date: Feb. 28, 2013, 16 pages.

(Continued)

*Primary Examiner* — Arthur O Hall
*Assistant Examiner* — Christopher R Dandridge
(74) *Attorney, Agent, or Firm* — Phillips 66 Company

(57) ABSTRACT

An apparatus comprising a reactor inlet distributor and a perforated deflector. In this apparatus the relationship between the diameter of the perforated deflector ($D_D$), the height of the opening of the inlet distributor pipe of the reactor inlet distributor ($H_{SLOT}$) and the outer diameter of the inlet distributor pipe ($OD_{DP}$) is:

$$D_D = OD_{DP} + 2(xH_{SLOT})$$

wherein x is at least ½.

5 Claims, 6 Drawing Sheets

(52) U.S. Cl.
CPC ............... *B01J 2208/0092* (2013.01); *B01J 2208/00849* (2013.01); *B01J 2208/00929* (2013.01); *B01J 2208/00938* (2013.01)

(58) Field of Classification Search
CPC ........ B01J 2208/0084; B01J 2208/0092; B01J 2208/00929; B01J 2208/00938; B01J 19/0053; B05B 5/00; F23D 11/32; F28C 1/00; B01D 3/008; C08K 9/06; C08K 3/22; C08K 5/56; C08K 2003/2237; C08L 83/04; C08L 83/00
USPC ............ 239/1, 592, 589, 269, 461; 422/220; 261/96, 109
See application file for complete search history.

(56) References Cited

U.S. PATENT DOCUMENTS

| | | | |
|---|---|---|---|
| 6,371,454 B1* | 4/2002 | Gerla et al. ............... | 261/114.1 |
| 6,723,291 B1* | 4/2004 | Wu ..................... | B01J 8/1827 |
| | | | 239/504 |
| 6,984,365 B2* | 1/2006 | Nelson et al. ............ | 422/224 |
| 7,055,583 B2 | 6/2006 | Filippi et al. | |
| 7,066,973 B1* | 6/2006 | Bentley ................ | B01J 8/0465 |
| | | | 422/198 |
| 7,261,751 B2 | 8/2007 | Dutta et al. | |
| 7,727,491 B2 | 6/2010 | Filippi et al. | |
| 7,901,641 B2* | 3/2011 | Kumar et al. ............ | 422/220 |
| 7,906,081 B2* | 3/2011 | Naunheimer ...... | B01D 53/0431 |
| | | | 422/211 |
| 8,734,728 B2* | 5/2014 | Guo et al. ............... | 422/220 |
| 2005/0028874 A1* | 2/2005 | Olbert ................ | B01J 8/0085 |
| | | | 137/592 |
| 2008/0093583 A1 | 4/2008 | Van Den Oosterkamp et al. | |
| 2011/0213186 A1 | 9/2011 | Di Girolamo et al. | |

OTHER PUBLICATIONS

Ronald G. McClung and Steve Novalany, "Choosing a Selective Hydrogenation System", Data has shown the effectiveness of palladium catalyst for the removal of diolefins and acetylenes in steam cracking as well as catalytic cracking, PTQ Q4 2002, pp. 1-9.

Tai-Sheng Chou, "Optimised Reactor Internals for a Hydroprocessing Unit", Optimised distributor and quench box design can improve catalyst performance and unit reliability, H2 Advance, PTQ Q2, 2012, pp. 1-8.

* cited by examiner

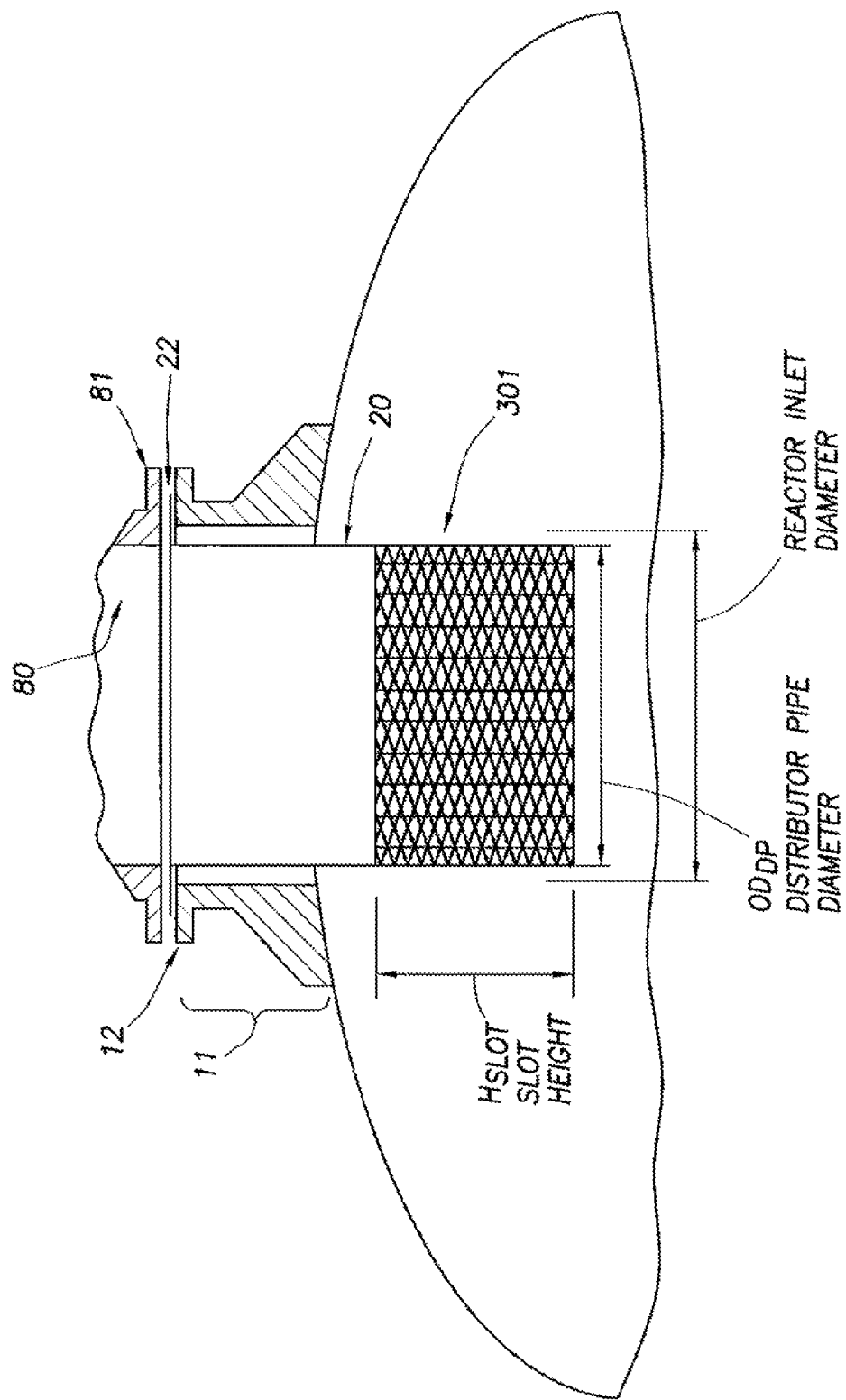

MODIFYING FLOW OF A REACTOR INLET DISTRIBUTOR

CROSS-REFERENCE TO RELATED APPLICATIONS

This application is a non-provisional application which claims the benefit of and priority to U.S. Provisional Application Ser. No. 61/604,332 filed Feb. 28, 2012, entitled "Apparatus for Modifying Flow of a Reactor Distributor Inlet," which is hereby incorporated by reference in its entirety.

FIELD OF THE INVENTION

An apparatus for uniformly distributing vapor in a reactor inlet distributor.

BACKGROUND OF THE INVENTION

Radial flow reactors are widely used to contact fluid reactants that are typically vapor with particulate catalyst. Radial flow reactors typically include a cylindrical vessel with a main inlet duct (inlet distributor) at one end and an annular chamber or series of chambers (scallops) arranged annularly around the interior periphery of the vessel for distributing reactants to an annular catalyst bed disposed inwardly of the scallops. A central outlet pipe (center-pipe) is disposed inwardly of the annular catalyst bed and is connected to a reactor outlet for the exit of product from the reactor. The scallops and the outlet center-pipe are permeable to fluid flow but impermeable to catalyst flow to contain the catalyst bed therebetween.

Examples of processes carried out in such an apparatus include various hydroprocessing techniques such as catalytic reforming, hydrotreating, dehydrogenation, dehydrocyclodimerization and isomerization. Additionally, radial flow reactors can be used in continuous-catalyst-regeneration reactor systems.

As mentioned above, a known type of radial reactor includes a series of scallops arranged concentrically around an outer periphery of the bed of catalyst. Each scallop is open at the top to allow vapor from the reactor head space to travel down the scallop. The top (open end) of the scallop typically protrudes above a cover deck that prevents downward vapor flow through the top section of the catalyst bed. The desired flow pattern is an equal amount of vapor going down each scallop arranged around the periphery of the reactor vessel. The vapor would then flow out of the scallops, through the catalyst and into the center-pipe. The scallops are formed by connecting multiple scallop members together into one long scallop chamber. A radially-inward face of each scallop is constructed of a screen or perforated plate to permit fluid flow from the scallop radially inwardly to the bed of catalyst. A center-pipe is constructed of a plurality of parallel wires or screen mesh covering a perforated pipe so as to permit the passage of vapor and prevent individual catalyst particles from passing through the screen.

However, these conventional scallops and center-pipes may cause or fail to correct the non-uniform distribution of vapor through the catalyst. A properly designed reactor inlet distributor is required to direct vapor toward the scallops within the headspace of the radial flow reactor. The non-uniform distribution of vapor could have detrimental effects on the reactor performance through the non-uniform utilization of catalyst and large variation in the force exerted by the vapor on the coverdeck or other internals. The non-uniform distribution of vapor in the reactor can negatively impact the yield of products from the reactor and reduce the efficiency or yield of the reactor; therefore, a need exists for a modified reactor inlet distributor to cause the flow to be more uniformly distributed within the head space of the reactor. Reactor inlet distributors can be made from materials commercially available; however, the specific design of these inlet distributors has a significant impact on the flow of vapors within the reactors head space.

SUMMARY OF THE INVENTION

An apparatus comprising a reactor inlet distributor and a perforated deflector. In this apparatus the relationship between the diameter of the perforated deflector ($D_D$), the height of the opening of the inlet distributor pipe of the reactor inlet distributor ($H_{SLOT}$) and the outer diameter of the inlet distributor pipe ($OD_{DP}$) is:

$$D_D = OD_{DP} + 2(xH_{SLOT})$$

wherein x is at least ½.

In another embodiment the apparatus comprises a reactor inlet distributor and a perforated deflector. In this embodiment the relationship between the diameter of the perforated deflector ($D_D$) and the outer diameter of the inlet distributor pipe ($OD_{DP}$) is:

$$D_H = N(½(D_D - OD_{DP}))$$

wherein N is any number between 0 and 1.

In yet another embodiment the apparatus comprises a reactor inlet distributor and a perforated deflector. In this embodiment the relationship between the height of the perforated deflector ($D_H$), the diameter of the perforated deflector ($D_D$) and the outer diameter of the inlet distributor pipe ($OD_{DP}$) is:

$$D_H = N(½(D_D - OD_{DP}))$$

wherein N is any number between 0 and 1.

In one embodiment the apparatus comprises a reactor inlet distributor and a perforated deflector. In this embodiment the dimensional relationship between the perforated deflector and the reactor inlet distributor is selected from at least one of the following three relationships:

a) wherein the relationship between the height of the perforated deflector ($D_H$), the diameter of the perforated deflector ($D_D$) and the outer diameter of the inlet distributor pipe ($OD_{DP}$) is:

$$D_H = N(½(D_D - OD_{DP}))$$

wherein N is any number between 0 and 1;

b) wherein the relationship between the diameter of the perforated deflector ($D_D$) and the outer diameter of the inlet distributor pipe ($OD_{DP}$) is:

$$D_H = N(½(D_D - OD_{DP}))$$

wherein N is any number between 0 and 1; and c) wherein the relationship between the diameter of the perforated deflector ($D_D$), the height of the opening of the inlet distributor pipe of the reactor inlet distributor ($H_{SLOT}$) and the outer diameter of the inlet distributor pipe ($OD_{DP}$) is:

$$D_D = OD_{DP} + 2(xH_{SLOT})$$

wherein x is at least ½.

In yet another embodiment the apparatus comprises a reactor inlet distributor and a perforated deflector. In this embodiment the relationship between the height of the perforated conical deflector ($D_H$), the diameter of the perforated conical deflector ($D_D$) and the outer diameter of the inlet distributor pipe ($OD_{DP}$) is:

$$D_H = N(\tfrac{1}{2}(D_D - OD_{DP}))$$

wherein N is any number between 0 and 1.

Additionally, the relationship between the diameter of the perforated conical deflector ($D_D$) and the outer diameter of the inlet distributor pipe ($OD_{DP}$) is:

$$D_H = N(\tfrac{1}{2}(D_D - OD_{DP}))$$

wherein N is any number between 0 and 1

Finally, the relationship between the diameter of the perforated conical deflector ($D_D$), the height of the opening of the inlet distributor pipe of the reactor inlet distributor ($H_{SLOT}$) and the outer diameter of the inlet distributor pipe ($OD_{DP}$) is:

$$D_D = OD_{DP} + 2(xH_{SLOT})$$

wherein x is at least ½.

The current embodiments also disclose a method of providing uniform distribution of vapor though the catalyst of a reactor inlet distributor through use of a perforated deflector. In this method the dimensional relationship between the perforated deflector and the reactor inlet distributor is selected from at least one of the following three relationships:
  a) wherein the relationship between the height of the perforated deflector ($D_H$), the diameter of the perforated deflector ($D_D$) and the outer diameter of the inlet distributor pipe ($OD_{DP}$) is:

$$D_H = N(\tfrac{1}{2}(D_D - OD_{DP}))$$

wherein N is any number between 0 and 1;
  b) wherein the relationship between the diameter of the perforated deflector ($D_D$) and the outer diameter of the inlet distributor pipe ($OD_{DP}$) is:

$$D_H = N(\tfrac{1}{2}(D_D - OD_{DP}))$$

wherein N is any number between 0 and 1; and
  c) wherein the relationship between the diameter of the perforated deflector ($D_D$), the height of the opening of the inlet distributor pipe of the reactor inlet distributor ($H_{SLOT}$) and the outer diameter of the inlet distributor pipe ($OD_{DP}$) is:

$$D_D = OD_{DP} + 2(xH_{SLOT})$$

wherein x is at least ½.

BRIEF DESCRIPTION OF THE DRAWINGS

The invention, together with further advantages thereof, may best be understood by reference to the following description taken in conjunction with the accompanying drawings in which:

FIG. 6 is an inlet distributor nozzle with a porous deflector made of expanded metal screen wrapped around the nozzle.

DETAILED DESCRIPTION OF THE INVENTION

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

Figure 1:
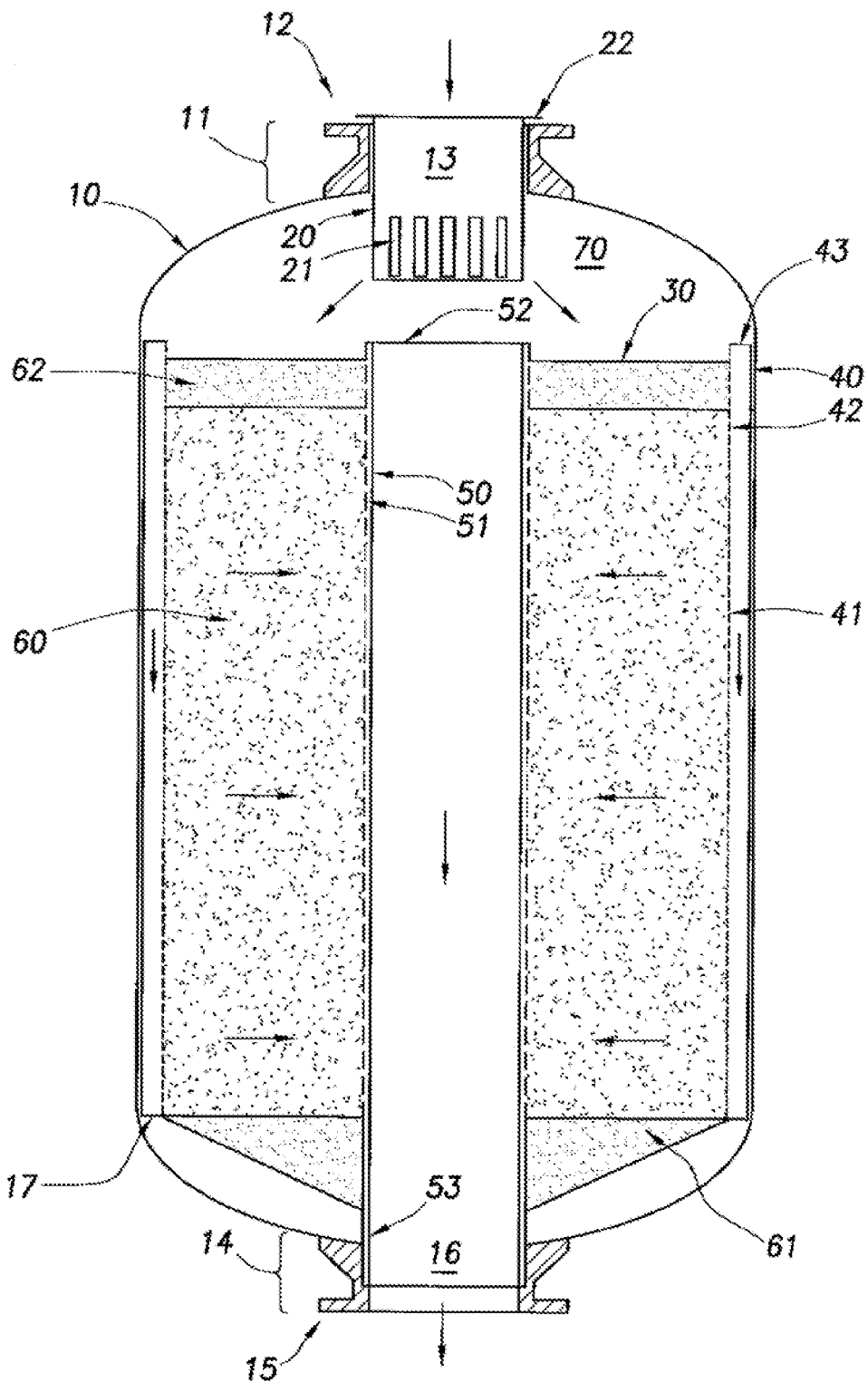
FIG. 1 is a generic schematic of one type of radial flow reactor.

Now referring to the drawings, wherein like numerals designate like components, FIG. 1 illustrates an embodiment of a generic radial flow reactor. The radial flow reactor 10 is operated to treat or react vapor across a bed of catalyst. Although the radial flow reactor depicted in FIG. 1 is a fixed-bed reactor, the apparatus and method can be applied to any type of radial-reactor bed such as a continuously or periodically moving reactor bed.

As illustrated in FIG. 1, the radial flow reactor can include a reactor vessel 10 having a wall which is cylindrical in shape. This particular reactor vessel includes a reactor inlet 11 (otherwise known as a top head) having a reactor inlet flange 12 and duct 13. Vapor to be treated is introduced from an inlet pipe (not shown) through the reactor inlet 11 into a reactor inlet distributor nozzle 20. The inlet distributor nozzles 20 used may be of varying design and typically have slots or openings of varying sizes. Vapor flows from the reactor inlet distributor nozzle 20 through the inlet distributor slot 21 into the reactor head space 70. The inlet distributor nozzle 20 may be attached in a variety of ways. Examples of different ways the inlet distributor nozzle 20 can be attached to the inlet pipe (not shown) include welding or by an inlet distributor flange support 22 which rests on the reactor inlet flange 12. The reactor cover deck 30 prevents vapor from flowing downward through the catalyst 60 and helps direct vapor flow toward the scallop openings 43. The scallops are arranged around the periphery of the interior of the reactor vessel 10; each sits on a scallop support ring 17. Each scallop has a top section with a solid front 42 and a main scallop body 40 with a perforated front 41. The scallop perforations are aligned with perforations in the center-pipe 50 to promote even vapor flow from the scallop body 40 to the center-pipe 50. In this particular embodiment the center-pipe 50 is disposed along a central axis of the reactor vessel 10. The annular space between the scallop body 40 and center-pipe 50 is filled with catalyst 60. Sitting on bottom inert support material 61 and covered with a layer of top inert support material 62. In one embodiment the center-pipe 50 is a perforated pipe covered by a center-pipe screen 51. The center-pipe screen 51 prevents catalyst migration into the center-pipe 50, while the perforated center-pipe controls the vapor flow evenly across the catalyst 60. The top of the center-pipe 52 is covered to prevent vapor and catalyst from entering the center-pipe 50. The bottom of the center-pipe 53 is connected with the reactor-outlet duct 16 in the bottom of the radial-flow reactor 10. The reactor outlet duct 16 is connected to the reactor outlet flange 15 which together make up the reactor outlet 14. During operation vapor flows from the bottom of the center-pipe 53 into the reactor outlet 14 and into the outlet pipe (not shown).

Still referring to FIG. 1, it will be generally understood that vapor follows a general path indicated by the arrows, entering from an inlet pipe (not shown) into the reactor 10 at the main inlet 11, through the inlet distributor nozzle 20 into the reactor head space 70, down the scallops 40, through the catalyst bed 60 into the center pipe 50, through the reactor outlet 14 into the outlet pipe (not shown).

As previously discussed, a conventional reactor inlet distributor may cause or fail to correct the non-uniform distribution of vapor entering the headspace of the radial flow reactor, which can have detrimental effects on the reactor performance. Retrofitting an existing reactor inlet distributor nozzle 20 or redesigning it with a porous deflector improves the radial flow reactor 10 performance, resulting in more uniformly distributed flow to the reactor catalyst 60. A porous deflector can be connected to an inlet distributor nozzle 20 so as to modify the fluid flow through the distributor and within the head space 70 of the reactor by causing a change in the direction of the vapor flow exiting the distributor. The perforated deflector can be manufactured from the same material used in the existing inlet distributor. The shape of the perforated deflector can be any shape that can deflect the vapor inside the radial flow reactor including a conical or flat shaped perforated deflector.

The porous deflector reduces the likelihood of damage to the cover deck 30 in high space velocity reactors. Redesigning the reactor inlet distributor 20 may be necessary to allow the porous deflector to fit through the reactor inlet duct 13. In radial-flow reactor 10 designs where an inlet distributor is absent, the deflector plate may be attached to the cover deck 30 or raised up off the cover deck.

Figure 2:
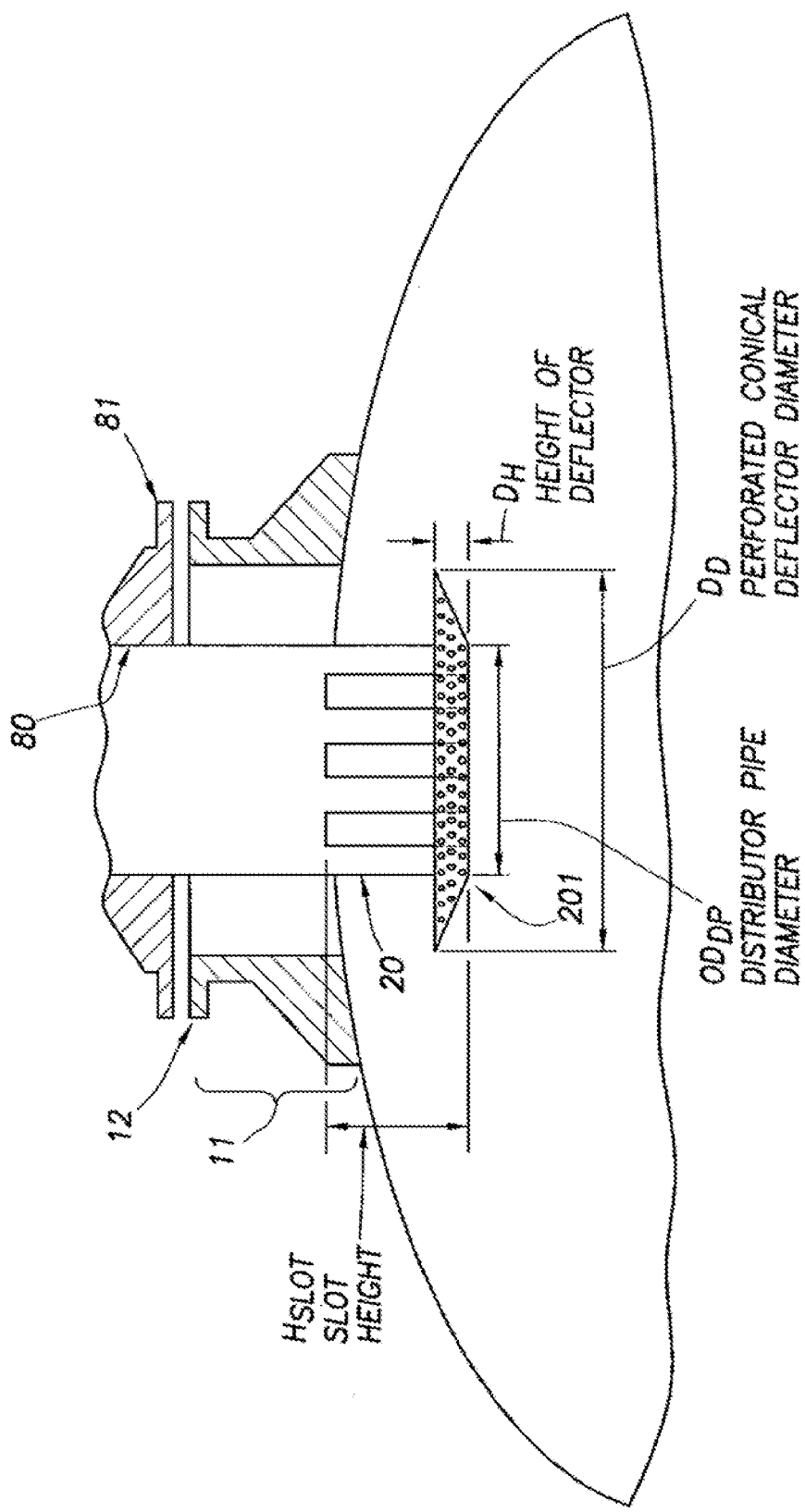
FIG. 2 is an inlet distributor nozzle with a porous deflector plate design attached to the inlet pipe.

In FIG. 2, the porous deflector is a perforated conical deflector attached to the bottom of the inlet distributor nozzle 20 which is attached to the inlet pipe (not shown). The perforated conical deflector 201 has a smaller diameter than the reactor inlet duct 13 but is wider that the inlet distributor nozzle 20. The porosity of the perforated conical deflector plate 201 is made using circular perforations or rectangular slots that are arranged to maintain a symmetric vapor flow pattern around the perforated conical deflector plate 201. The size and density of the perforations may be varied to adjust pressure drop. In one embodiment the size of the perforations in the perforated deflector can be from ¼" to 1" in size. In other embodiments the size can be from ⅛" to 1¼" or even ⅙" to 1¼" in size. The porosity controls the fraction of the inlet flow to pass through the perforated conical deflector plate 201 and consequently the fraction of redirected flow to the radial flow reactor vessel wall.

In one embodiment the diameter of the perforated deflector ($D_D$) can be determined with a relationship between the height of the opening in the inlet distributor pipe ($H_{SLOT}$) and the outer diameter of the inlet distributor pipe ($OD_{DP}$) utilizing the following relationship:

$$D_D = OD_{DP} + 2(xH_{SLOT})$$

Where x is at least ½.

Alternatively in another embodiment, the diameter of the perforated deflector ($D_D$) can be determined with a relationship with the outer diameter of the inlet distributor pipe ($OD_{DP}$) utilizing the following relationship:

$$D_D = OD_{DP} + 2(\tfrac{1}{3}OD_{DP})$$

In yet another embodiment, the height of the perforated deflector can be a fraction of the diameter of the inlet distributor pipe and/or the height of the inlet distributor pipe openings. In determining the height of the perforated conical deflector ($D_H$), a relationship between the diameter of the perforated deflector ($D_D$) and the outer diameter of the inlet distributor pipe ($OD_{DP}$) is utilized, providing:

$$D_H = N(\tfrac{1}{2}(D_D - OD_{DP}))$$

where N is any number between 0 and 1.

The internal angle between the conical perforated deflector and the inlet distributor pipe is determined by the height and diameter of the conical perforated deflector.

Figure 3:
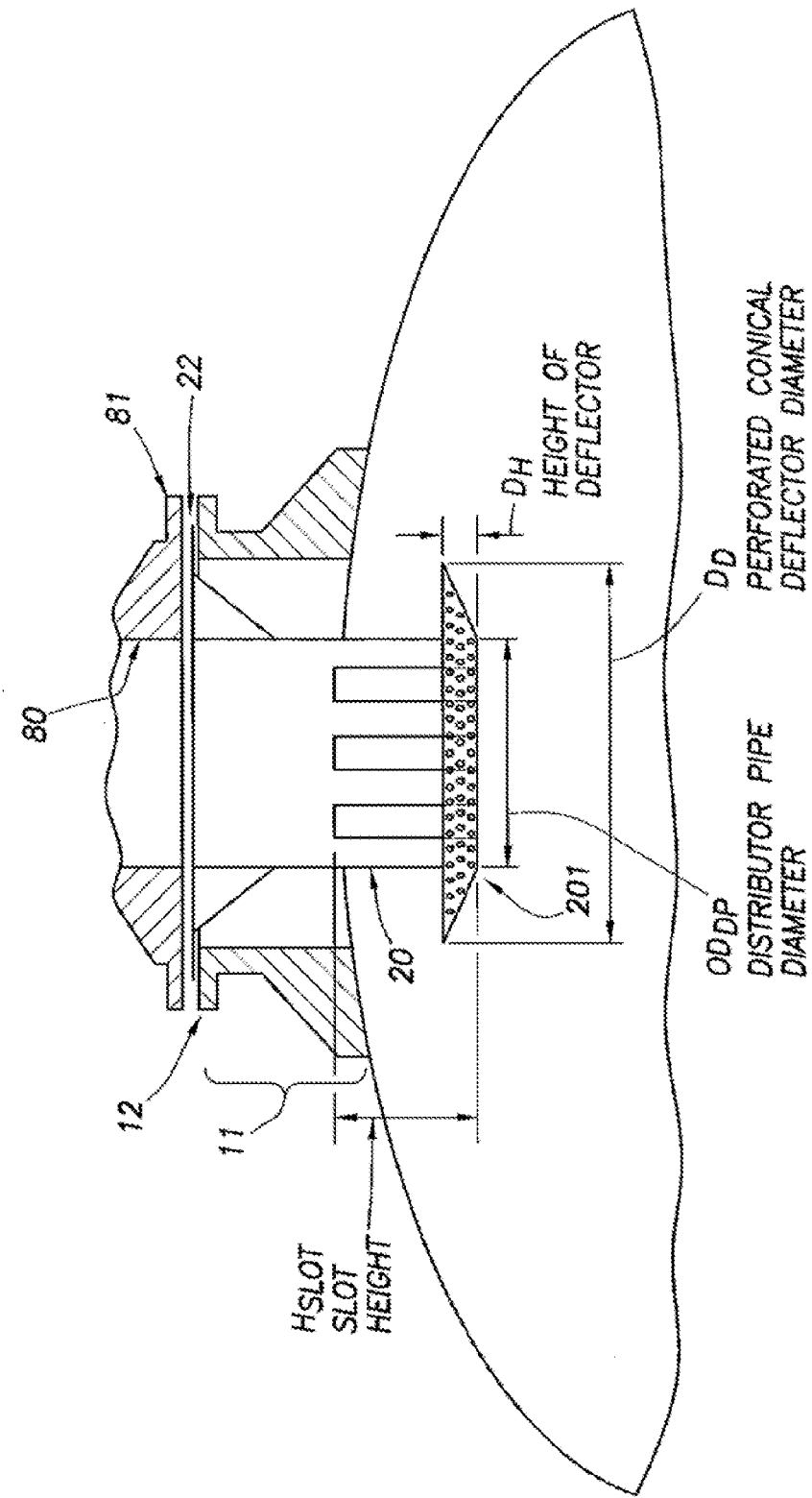
FIG. 3 is an inlet distributor nozzle with a porous deflector plate design resting on the reactor inlet flange.

In FIG. 3, the porous deflector is a perforated conical deflector attached to the bottom of the inlet distributor nozzle 20 which is not attached to the inlet pipe (not shown), but rather is an insert supported by the reactor inlet flange 12. Since the existing conventional inlet distributor nozzle 20 is likely slightly smaller diameter than the reactor inlet duct 13, the entire inlet distributor nozzle is redesigned to allow the conical porous deflector plate 201 to be added to the inlet distributor nozzle. Calculations for the conical porous deflector plate dimensions can be done similar as explained above once a diameter for the inlet distributor nozzle is determined.

Figure 4:
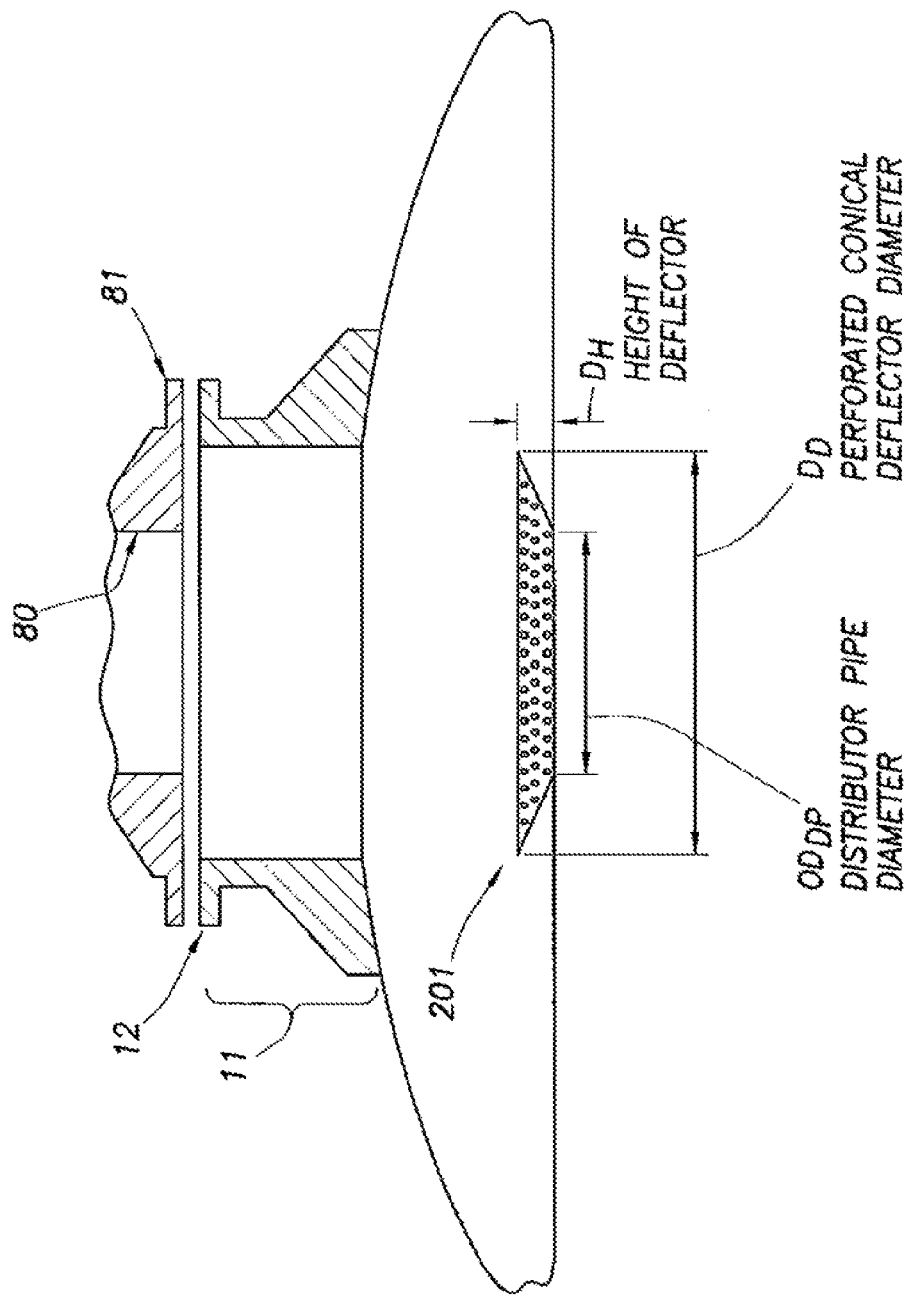
FIG. 4 is a porous deflector plate attached to the cover-deck where no inlet distributor nozzle is present.

FIG. 4, the porous deflector is a perforated conical deflector attached to the cover deck 30 in reactor designs where the cover deck to too near the reactor inlet 11 to allow an inlet distributor nozzle 20. The diameter of the conical porous deflector can be determined from the diameter of the reactor inlet duct 13 and can be installed in two pieces on the cover deck. Calculations for the conical porous deflector plate dimensions can be done similar as explained above once a diameter is determined.

Figure 5:
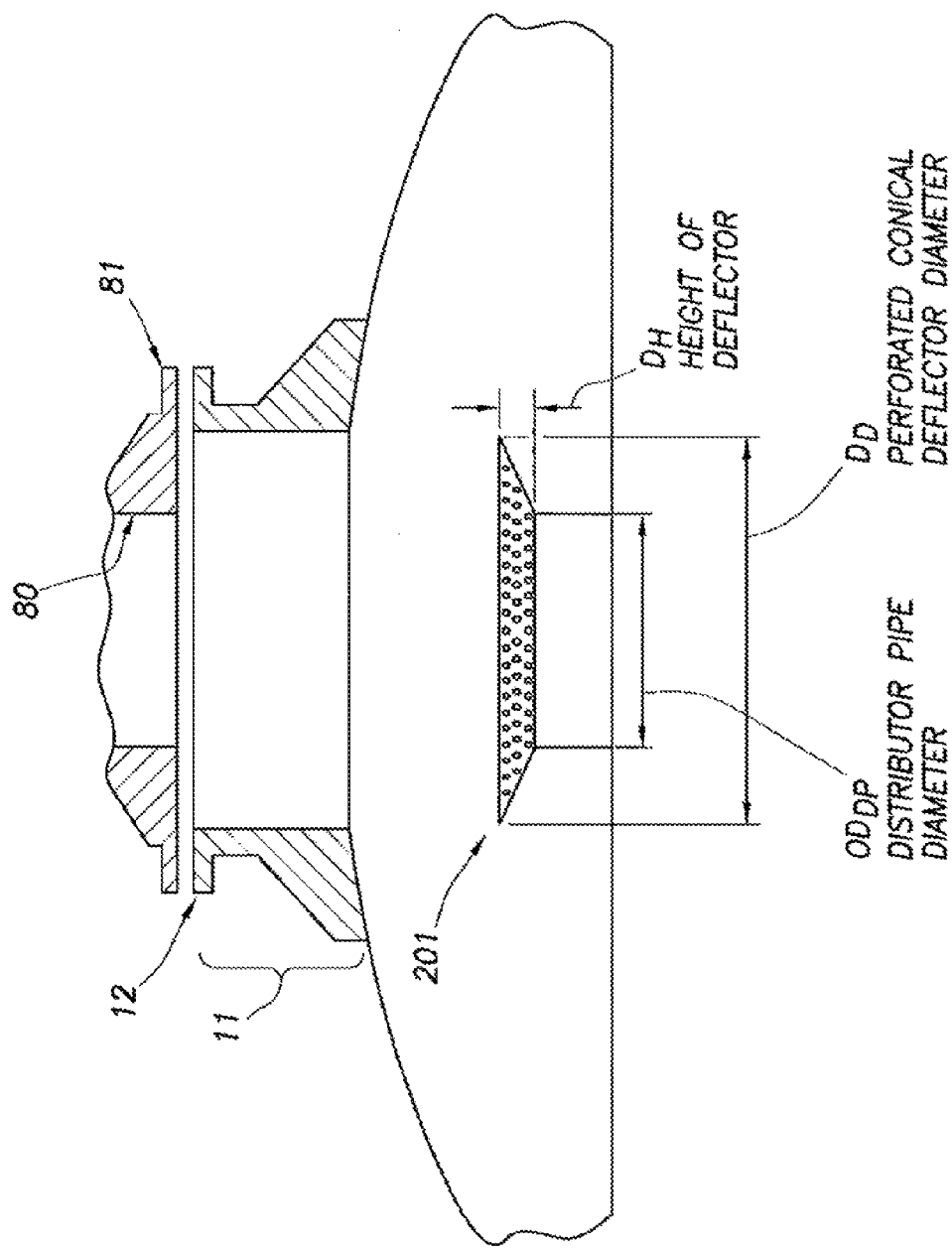
FIG. 5 is a porous deflector plate attached to, but raised up off the cover-deck where no inlet distributor nozzle is present.

FIG. 5, the porous deflector is a perforated conical deflector attached to, but elevated above the cover deck 30 in reactor designs where the cover deck is too near the reactor inlet 11 to allow an inlet distributor nozzle 20 but far enough away to need some elevation to function properly or in other reactor designs where installation of a reactor inlet nozzle is impractical. The diameter of the conical porous deflector can be determined from the diameter of the reactor inlet duct 13 and can be installed in two pieces on the cover deck. Calculations for the conical porous deflector plate dimensions can be done similar as explained above once a diameter is determined.

FIG. 6, the porous deflector is an expanded metal screen deflector 301. The expanded metal screen deflector is placed over the inlet distributor nozzle 20 for a reactor inlet duct 13 marginally larger than the inlet distributor nozzle 20. The expanded metal screen deflector is placed over the slots in the inlet distributor pipe. The sizes of the slots are increased according to the solidity of the expanded metal screens. The strands of the expanded metal screens act like vanes to alter the fluid flow direction. The vanes will be oriented such that the intended direction of flow after passing through the expanded metal screen is upwards or in a direction opposite to the upstream vapor flow. The angle of the vanes is dependent on the width of the expanded metal screen strands and the size of the expanded metal screen opening. The size of the expanded metal screen openings is either a fraction of the open height of the inlet distributor pipe openings or the outer diameter of the inlet distributor pipe or the amount of area reduction by the expanded metal screen for vapor flow.

In an embodiment, flow turning vanes may be inserted inside of the elbows of the reactor inlet pipe (not shown) to reduce the circumferential variation in the feed vapor.

In an embodiment, flow turning vanes may be installed in the inlet distributor nozzle 20 openings or slots to achieve the intent of the perforated deflector or expanded metal screens.

The use of the perforated deflector reduces the energy required to achieve an equivalent uniform fluid flow distribution when compared to throttling or reducing the inlet distributor nozzle slot open area. The reduced energy and lower pressure drop across the inlet distribution reduces the operating cost of improved vapor flow distribution.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A reactor inlet for delivering vapor into a radial inflow catalytic reactor wherein the catalytic reactor is the type that has an outer wall shell defining a large reaction space within the outer wall shell, a center-pipe, a catalyst bed within the reaction space around the center-pipe, a head space above the catalyst bed and center-pipe and a series of scallops along the inside of the outer wall shell of the catalytic reactor and also around the outside of the catalyst bed to direct vapor from the inlet into the head space and then to the scallops, through the catalyst bed and then to the center-pipe which is connected to an outlet of the catalytic reactor, wherein the reactor inlet comprises:
a) a generally cylindrical distributor pipe having a peripheral wall, a first end or top end through which feed vapor is received and an opposite end or bottom end that is arranged to extend into the head space of a reactor, wherein the feed vapor is arranged to exit through openings extending radially outwardly through the peripheral wall of the distributor pipe adjacent to the opposite end or bottom end of the distributor pipe and out into the headspace and further wherein the peripheral wall of the distributor pipe has an outer diameter;
b) a deflector plate attached to the opposite end or bottom end of the distributor pipe wherein the deflector plate has a diameter that is larger than the outer diameter of the peripheral wall of the generally cylindrical distributor pipe such that the deflector plate is arranged to be positioned within the head space of the reactor, and further wherein the deflector plate has an outer edge and a generally circular bottom with a continuous periphery of the circular bottom wherein the circular bottom extends across the opposite end or bottom end of the generally cylindrical distributor pipe at least to the peripheral wall of the generally cylindrical distributor pipe so as to also define a terminal end of the generally cylindrical distributor pipe and the reactor inlet wherein the deflector plate further includes a sloped wall extending from the continuous periphery of the circular bottom in an outwardly direction from the peripheral wall of the generally cylindrical distributor pipe and angled back towards the first end or top end of the generally cylindrical distributor pipe at the opposite end or bottom end to deflect feed vapor that has passed through the openings in the peripheral wall of the generally cylindrical distributor pipe and radially away from the openings in a direction that is angled somewhat back towards the first end of the distributor pipe so as to follow the outer wall shell of the catalytic reactor to the scallops and then into the catalyst bed; and
c) holes in the sloped wall of the deflector plate to allow some of the feed vapor to pass through the deflector;
wherein there is a relationship between the diameter of the perforated deflector ($D_O$) and the height of the openings of distributor pipe of the reactor inlet distributor ($H_{SLOT}$) and the outer diameter of the distributor pipe ($OD_{DP}$):

$$D_O = OD_{DP} + 2(xH_{SLOT})$$

wherein x is at least ½.

2. The reactor inlet according to claim 1 where the sloped wall has the shape of a truncated cone.

3. The reactor inlet according to claim 2 where the bottom of the deflector is flat in shape.

4. The reactor inlet according to claim 3 where the sloped wall is sloped outwardly at an angle of less than forty five degrees from the plane of the flat bottom.

5. The reactor inlet according to claim 1 where feed vapor is arranged to flow out of the distributor pipe through the openings adjacent the opposite end and then a portion of the feed vapor is arranged to pass over the outer edge while another portion of the feed vapor is arranged to flow through holes in the deflector.

* * * * *